United States Patent [19]

Giesing et al.

[11] Patent Number: 4,609,752

[45] Date of Patent: Sep. 2, 1986

[54] PROCESS AND APPARATUS FOR CONTINUOUSLY SYNTHESIZING ALKOXYPOLYSILOXANES

[75] Inventors: Herbert Giesing; Götz Koerner; Václav Kropac, all of Essen; Hans-Jürgen Patzke, Gelsenkirchen-Resse; Herbert Quilitsch, Heiligenhaus; Harald Rau, Essen; Eckehard Schamberg, Essen; Fritz Spieker, Essen; Christian Weitemeyer, Essen, all of Fed. Rep. of Germany

[73] Assignee: Th. Goldschmidt AG, Essen, Fed. Rep. of Germany

[21] Appl. No.: 752,937

[22] Filed: Jul. 8, 1985

[30] Foreign Application Priority Data

Jul. 7, 1984 [DE] Fed. Rep. of Germany ....... 3425067

[51] Int. Cl.$^4$ .............................. C07F 7/08; C07F 7/18
[52] U.S. Cl. ..................................... 556/457
[58] Field of Search ......................................... 556/457

[56] References Cited

U.S. PATENT DOCUMENTS

| 2,415,389 | 2/1947 | Hunter et al. | 556/457 |
| 3,260,699 | 7/1966 | Schmidt | 556/457 X |

*Primary Examiner*—Paul F. Shaver
*Attorney, Agent, or Firm*—Toren, McGeady, Stanger, Goldberg & Kiel

[57] ABSTRACT

A continuous process for the preparation of alkoxypolysiloxane in which silane or a silane mixture and a mixture of hydrogen chloride-containing alcohol and water is fed continuously into the lower region of preferably cylindrical stirred reactor, the reaction product formed together with excess hydrogen chloride-containing alcohol is drawn off continuously after residence time of 30 to 180 minutes at the upper end of the reactor and the undissolved, gaseous portion of hydrogen chloride is carried off at the head of the reactor, the temperature of the reaction mixture or the reaction product, as it flows through the reactor, being raised from a range of $-17°$ to $+30°$ C. to range of $+30°$ to $+80°$ C., the temperature gradient having to be at least 10° C., and the excess alcohol and dissolved hydrogen chloride being removed outside of the reactor in a known manner from the reaction product formed, and the hydrogen chloride-containing alcohol obtained while working up to reaction product being recycled to the reactor. The invention furthermore relates to an apparatus which is particularly suitable for implementing the process.

14 Claims, 1 Drawing Figure

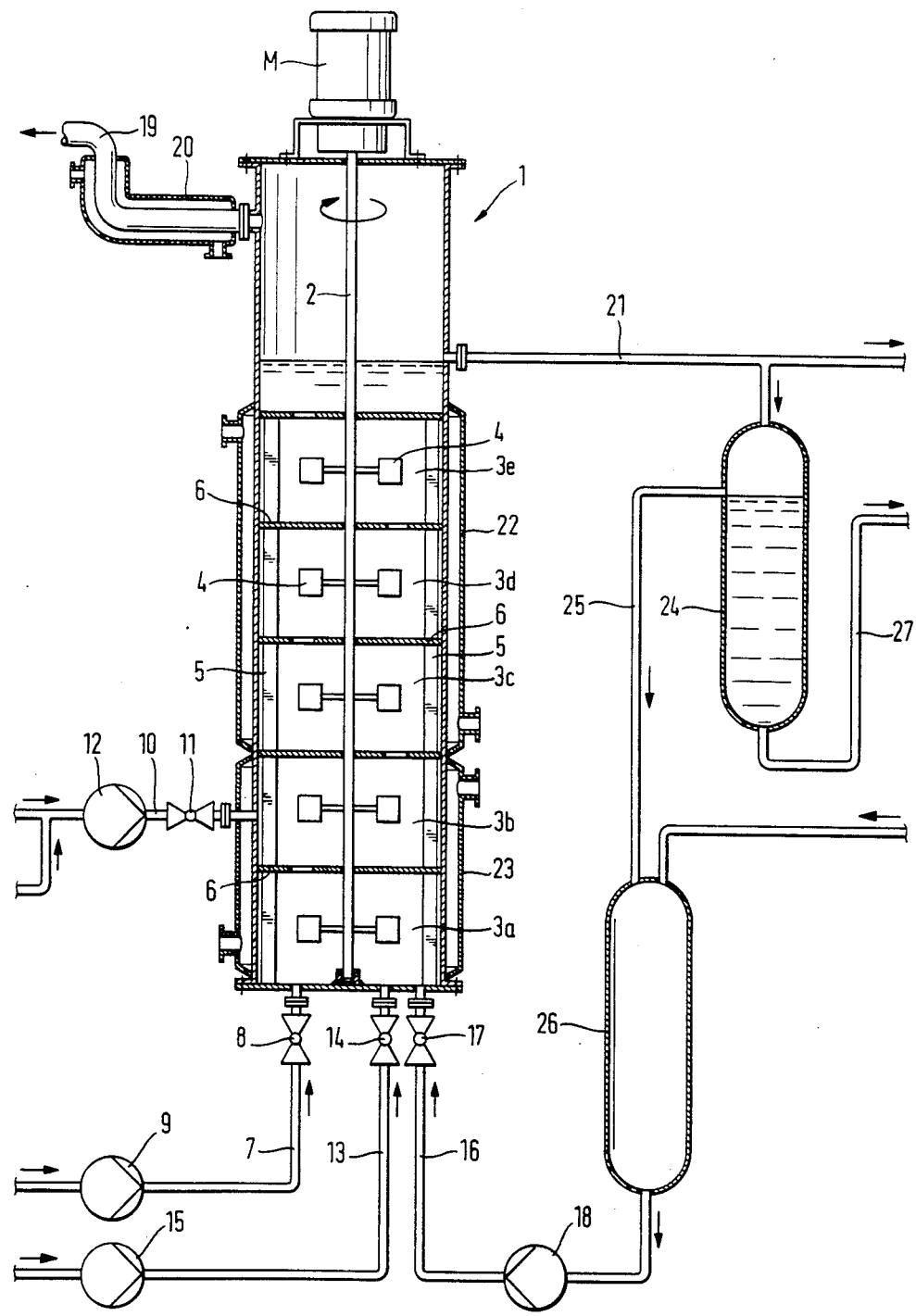

PROCESS AND APPARATUS FOR CONTINUOUSLY SYNTHESIZING ALKOXYPOLYSILOXANES

BACKGROUND OF THE INVENTION

1. Field of the Invention

The invention relates to a process for continuously synthesizing alkoxypolysiloxanes having the general formula $$R^1_a Si(OR^2)_b O_{\frac{4-(a+b)}{2}}  \quad\quad I$$

in which
R[1] is an alkyl or aryl radical,
R[2] is a lower alkyl radical with 1 to 4 carbon atoms,
a is not greater than 1.5,
b is not greater than 2, and
a+b is not greater than 3,
by solvolysis of chlorosilanes of the general formula $$R^1_a SiCl_{4-a}$$

with, relative to the silicon-linked chlorine, an excess of alcohol and less than an equivalent amount of water, and partial condensation of the solvolysis products. The invention furthermore relates to equipment for carrying out this process.

2. Description of the Prior Art

Because of the alkoxy groups linked to silicon, alkoxypolysiloxanes are reactive compounds, which can be used either directly as such, for example, for impregnating purposes, or as reactive intermediates. Alkoxypolysiloxanes of the aforementioned formula I moreover represent valuable intermediates for curable silicone resins.

It is particularly important that such alkoxysiloxanes be produced in as uniform and reproducible a composition as possible by inexpensive means and by a process that can be carried out as simply as possible. Fulfilling these requirements is difficult because of the different reactivities of the silanes which depend on the functionality and substitution. A particular problem is that some trifunctional silanes tend to gel when reacting with water, even when the reaction is carried out in the presence of an excess of alcohol. Consequently, the gelled silanes are unavailable for the condensation reaction and since their availability cannot be controlled, the production of uniform alkoxypolysiloxanes becomes difficult. It is therefore particularly difficult to synthesize reproducible alkoxypolysiloxanes whose a-value is low, especially not greater than 1.5, since silane mixtures with a high proportion of trifunctional silanes or, for particularly low a-values, trifunctional silanes by themselves are used to synthesize such alkoxypolysiloxanes.

It is particularly desirable to synthesize alkoxypolysiloxanes with a low a-value in a continuous process, since the equipment expense for high space/time yields can be justified only with a continuous process.

Processes are known for synthesizing alkoxypolysiloxanes continuously. In these processes, it is attempted to counter the aforementioned difficulties due to high reactivity, especially that of trifunctional halogensilanes with water, by suppressing the reaction through the addition of an inert solvent and/or first converting the halogensilanes completely or predominantly into alkoxysilanes. The alcoholysis products which are formed at first, are reacted with less than equivalent amounts of water and partially condensed. The alcoholysis process is therefore separated from the hydrolysis process and from the condensation process and is carried out either in different zones of one apparatus or in separate reaction vessels. Moreover, the alcoholysis is usually carried out at elevated temperatures, i.e. at the boiling points of the alcohols used. In this reaction and under these reaction conditions, the predominant amount of the hydrogen halide formed is liberated and removed from the system.

The closest state of the art is represented especially by the following publications.

German Offenlegungsschrift 20 61 189 relates to a process for continuously synthesizing optionally substituted alkoxysilanes or optionally substituted alkoxypolysiloxanes by reacting chlorosilanes with optionally substituted alcohols and, optionally, with water in a column equipped with reflux condenser and kept at an elevated temperature. The process is characterized by the fact that the chlorosilane is introduced at the head of the column, the optionally substituted alcohol is introduced in gaseous form from below, or at a place between the lower end and the upper end of the lowest third of the length of the column, and the water, if used, is introduced at any place in the column. The reaction product is taken from the lower end of the column or below the place where the alcohol is introduced. The temperature of the column is maintained over the whole of its internal cross section and at least over two thirds of the distance between the place of entry of the alcohol and the place of entry of the silane into the column, at least ½20 C. above the boiling point of the alcohol used at the pressure existing in the column. Excess alcohol, boiling under reflux, is constantly present at the head of the column during the reaction. As is evident particularly from the examples, the emphasis in this process is on the continuous synthesis of alkoxysilanes. For example, the methyltrichlorosilane, which is at the head of the column at room temperature, is fed into the column, which is heated to 100° C. Below the place of introduction of the silane, ethanol is introduced in gaseous form at a temperature of 110° C. The reaction of the ethanol with the methyltrichlorosilane therefore takes place at high temperatures. The alkoxysilane formed flows from the lower end of the column and is purified by distilling off the excess ethanol.

If partial hydrolysis of the methyltrichlorosilane is to take place at the same time, the methyltrichlorosilane, according to the example, is used in the form of its solution in toluene and the water is introduced in gaseous form at a temperature of 105° C. into the column below the place where the silane is introduced. This process, however, does not produce a uniform reaction product of relatively high molecular weight, but a mixture of low molecular weight methylethoxy polysiloxanes and methyltriethoxysilane.

A further development of this process is described in German Offenlegungsschrift 28 06 036. The characteristic features of this process consist in that alcohol, water and, if necessary, an acidic catalyst which promotes the condensation of silicon-linked condensable groups, are constantly introduced into a still, which is equipped with a column and, if necessary, a reflux condenser, and which already contains the desired polysiloxane. The amounts added are such that there are at least 5 weight percent of the alcohol and 0.001 to 5 weight percent of the catalyst, these percentages being based on the total weight of the alcohol, catalyst and polysiloxane in the still. The contents of the still are heated so as to boil under reflux. Halogensilane, to be reacted is introduced into the column at least 1 m above the lower end of the column and polysiloxane is constantly drawn off from the still in proportion to its formation.

This process also uses a column with reflux condenser and still, which already contains the desired polysiloxane and to which alcohol, water and, if necessary, a catalyst, are constantly added in specific amounts so that when the process is running under conditions of reflux, the alcohol used for the alcoholysis, is boiling and the halogensilane is fed into the column at a fixed minimum distance from the lower end of the column. The alcoholysis therefore takes place in the column, while the hydrolysis and condensation take place after the alcoholysis in the still. Separation of the alcoholysis reaction, on the one hand, and of the hydrolysis/condensation reaction, on the other, is achieved with this process.

The process requires a relatively high expenditure of energy since it is necessary to work permanently under conditions of reflux. The throughput of the equipment is limited by the need to carry out the preliminary reaction in the upper region of the column.

A further modification of this process is described in European Patent Application No. 0 032 376. This process is characterized by the fact that chlorosilane and an aliphatic compound with an alcoholic hydroxyl group, each in liquid form, are introduced in amounts of 0.5 to 0.9 gram moles of alcoholic hydroxyl group per gram atom of silicon-linked chlorine in co-current flow in a first step into a first reactor, in which they are mixed together. The liquid reaction mixture emerging from the first reactor is introduced, in a second step, at the head of a column used as second reactor and maintained at an elevated temperature. An aliphatic compound with an alcoholic hydroxyl group is introduced in gaseous form in an amount at least sufficient to completely convert the remaining silicon-linked chlorine in the reaction mixture obtained in the first step, at the lower end of the column or at a place between the lower end and the upper end of the lower third of the column. Water, if necessary, is introduced at any place in the column and the reaction product is taken from the column at its lower end or from a place below where the aliphatic compound with an alcoholic hydroxyl group is introduced.

With this process, therefore, alcoholysis with a partial amount of the alcohol takes place in a first reactor. The remaining amount of alcohol is added to the product of the process in a second reactor, water being added to the second reactor, if condensation of the silanes to siloxanes is desired. This second reactor is once again constructed as a column, and the addition of the remaining amount of alcohol and, if necessary, of the water takes place in the heated column. The examples exclusively describe the preparation of alkoxysilanes. This process also has the disadvantages of requiring relatively expensive equipment and of having to maintain elevated temperatures, namely, at least the boiling point of the aliphatic alcohol used.

U.S. Pat. No. 3,688,180 describes a process for the preparation of alkoxyorgano polysiloxanes in which an organohalogensilane is first reacted in the presence of a hydrocarbon solvent, water and a lower aliphatic alcohol in a reactor at −10 to +10° C. and the intermediate produced is supplied continuously to a second reactor, which contains additional solvent, the reaction being brought to conclusion there under reflux conditions. Here also, the disadvantages of the process lie in the need to use two reactors and, additionally, in the need to use solvents.

SUMMARY OF THE INVENTION

We have discovered a method for the continuous synthesis of alkoxypolysiloxanes having the general formula I which can be carried out in simple equipment with a high space/time yield, with as little additional energy as possible, and without additional solvents. In addition, with the inventive process, alkoxypolysiloxanes are obtained in a reproducible composition, even at a-values which do not exceed 1.5.

More particularly, in the present process, a silane or a silane mixture and a mixture of hydrogen chloride-containing alcohol and water, are continuously fed into the first stage of a lower region of a reactor. The reactor comprises a series or plurality of sequential stages wherein each subsequent stage is positioned higher than the preceding stage. The reaction product formed, together with excess hydrogen chloride-containing alcohol is drawn off continuously from the upper end or last stage of the reactor after a residence time of 30 to 180 minutes. The undissolved gaseous portion of the hydrogen chloride is carried off at the head of the reactor and the temperature of the reaction mixture or the reaction product, as it flows through the reactor, is raised from a range of −17 to +30° C. to a range of +30 to +80° C., the temperature gradient being at least 10° C. The excess alcohol and dissolved hydrogen chloride are removed from the reaction product formed outside of the reactor in a known manner and the hydrogen chloride-containing alcohol obtained while working up the reaction product is recycled to the reactor.

BRIEF DESCRIPTION OF THE DRAWING

The drawing is a representation of an apparatus for carrying out the process of the invention.

DESCRIPTION OF THE PREFERRED EMBODIMENTS

Only one reactor is therefore used in the inventive process and this is preferably a cylinder-shaped, stirred reaction vessel. Also, it is preferable that a vertical reactor be used. Even though a cylinder-shaped reactor is preferred for reasons of simplicity in construction, a reactor, comprising, for example, spherical segments can also be used. At least two streams of reactants are fed into the lower region of the reactor: (a) the silane or silane mixture and (b) an excess of the alcohol used for the alcoholysis and the water required for the partial hydrolysis. The excess amount of alcohol not required for the alcoholysis, becomes saturated with hydrogen chloride that is released and, in the course of the continuous process, is recycled to the reactor supplemented by the amount of alcohol required for the alcoholysis. With such a procedure, a high hydrogen chloride concentration is maintained in the alcohol. As a result, the amount of hydrogen chloride that dissolves in the excess alcohol is limited to that required for attaining a saturated concentration, while the remaining amount of hydrogen chloride is carried away in the gaseous state from the reaction medium and withdraws from this the corresponding amount of heat of vaporization. In the lower region of the reactor therefore, the temperature adjusts to a value, which is lower than the average temperature of the reaction streams. The reaction mixture cools off in the lower region of the reactor.

In a preferred embodiment of the inventive process, the silane is first of all mixed with all or a portion of the hydrogen-chloride-containing alcohol and allowed to react completely or partially. Water together with the any remaining amount of alcohol, is metered into this preliminary reaction product. In this case also, the water required for the partial hydrolysis is supplied to the lower region of the reactor.

Corresponding to the measured amounts of silane, hydrogen-chloride-containing alcohol and water added and the filling capacity of the reactor, the reaction mixture rises into the middle and upper region of the reactor in which a temperature of 30° C. to 80° C. is maintained by suitably controlling the temperature. After an average residence time of 30 to 180 minutes, the reaction product is discharged from the upper region of the reactor and subjected to further working up. The amount of hydrogen chloride no longer soluble in the reaction medium under the process conditions, escapes from the head end of the reactor and is converted in a known manner by neutralization into a form, which can be easily disposed of or mixed with sewage water.

Working up of the reaction mixture depends essentially on whether the heterogeneous reaction mixture which flows over, divides within a justifiable time into an alcoholic upper and an alkoxysiloxane-containing lower phase.

If the reaction mixture does not separate in an appropriate time, the hydrogen chloride-charged alcohol can be stripped from the reaction product in suitable distillation equipments and, supplemented by the amount of alcohol consumed, returned to the lower end of the reactor.

In most cases, the phases of the reaction mixture formed separate, that is, a siloxane phase separates from an alcoholic phase that contains the bulk of the hydrogen chloride. In this case, it is advisable to transfer the heterogeneous reaction mixture to an intermediate tank, in which the two phases separate and from which they are then drawn off continuously. The silane phase is then freed in a known manner from any dissolved alcohol and hydrogen chloride and the alcohol/hydrogen chloride phase is returned to the reactor.

In order to separate any still remaining portions of SiCl groups as well as dissolved hydrogen chloride from the alkoxypolysiloxanes obtained, the initially obtained alkoxypolysiloxanes can, in a further embodiment of the process, be mixed with excess amounts of hydrogen chloride-free alcohol and heated under reflux, and the alcohol and the hydrogen chloride can be distilled off and the reaction product neutralized, if necessary.

The inventive continuous process fulfills all of the initially set requirements. Even after the process has been operating continuously for several days, the equipment and the reaction mixture are free from gel or gel particles. This is an important prerequisite for carrying out the process without breakdowns and especially for the trouble-free operation of the pumps and metering equipment required for the metered addition of the reaction streams.

Any silanes may be used for the inventive process. The $R^1$ radicals are alkyl and/or aryl radicals. As alkyl radicals, lower alkyl radicals, especially those with 1 to 6 carbon atoms, are preferred. Preferably, the alkyl radicals are methyl radicals. However, silanes, which contain alkyl radicals of a higher molecular weight, such as those with up to 18 carbon atoms linked to the silicon atom, or whose alkyl radicals are unsaturated, such as, vinyl radicals, may also be used. As aryl radicals, phenyl radicals are preferred.

Organopolysiloxanes may be added to the silane or silane mixture. The organopolysiloxanes may contain mono, di, and trifunctional organosiloxy units. They may additionally have $R^2O$-alkoxy groups which are linked to silicon. Examples of siloxanes are hexaorganodisiloxanes, as well as organoalkoxysiloxanes, the compositions of which can deviate from that of the process products. The type and quantity of organosilanes and organopolysiloxanes are moreover selected in such a manner that, in respect to the $R^1$ groups linked directly to the silicon atom, they correspond overall to the composition of the process products. Under the conditions of the inventive process, splitting of the organopolysiloxanes takes place and is followed by complete incorporation of the products of the splitting reaction.

The alcohols of formula $R^2OH$, used for the alcoholysis, contain 1 to 4 carbon atoms. Preferably, alcohols with 1 or 2 carbon atoms are used. If alcohols with 3 or 4 carbon atoms are used, they may also be branched.

Those skilled in the art will understand that halogensilanes, other than chlorosilanes, may also be used. As a rule, however, these are not practical for economic reasons.

The a-value of the alkoxypolysiloxanes results from the a-value of the corresponding silanes, silane mixtures or silane/siloxane mixtures which are used for the process. The b-value results particularly from the amount of water used for the partial hydrolysis. To some extent, however, it also depends on the reaction temperature.

The inventive process is preferably carried out in an apparatus corresponding to the drawing which is characterized by a preferably cylindrically shaped reactor 1 with stirrer 2 and stirrer blades 4. The reactor is subdivided by perforated, horizontal separator plates 6 into a number of stirred cells 3a to 3e. Pipeline 7 is provided with a shut-off device 8 and metering device 9 for supplying the silane or silane mixture. Pipeline 10 with shut-off device 11 and metering device 12 is for supplying the water or a water/alcohol mixture. Pipeline 16 with shut-off device 17 and metering device 18, is provided for recycling the hydrogen chloride-containing alcohol. Pipelines 7 and 16 discharge into stirred cell 3a at the base of the reactor and pipeline 10 discharges into the next higher stirred cell 3b. Pipeline 19 has a cooling jacket 20 and is provided for carrying away the gaseous hydrogen chloride. Pipeline 21 is carrying away the reaction product. Pipeline 19 opens out into the head of the reactor 1 and pipeline 21 is arranged in the upper region of the reactor 1 above the last stirred cell 3e. Two separate temperature-controlling mantles 22 and 23 are provided for heating or cooling the reactor 1 in the region of stirred cells 3a to 3e.

Baffles 5 are preferably arranged in stirred cells 3a to 3e.

To implement the process, the reactor is first of all supplied at its base through pipeline 7 with the halogensilane or the appropriate halogen silane mixture and through pipeline 16 with the hydrogen chloride-containing alcohol which is obtained in the phase separation and/or in the distillation and recycled. These are metered in, preferably by metering pumps 9 and 18, respectively, which can be checked and readjusted by means of a scale or a flow meter. Shut-off devices 8 and 17 are provided immediately before each inlet into the reactor.

The two reaction streams entering the reactor are mixed intensively in the first stirred cell 3a with the help of stirrer blades 4 and caused to react.

In the second stirred cell 3b, the alcohol/water mixture is supplied from pipeline 10. This mixture is also supplied preferably through a metering pump 12, which can be readjusted based on volume or weight control. A shut-off device 11 is provided before the inlet into the reactor.

The perforated separator plates 6 between the individual stirred cells 3a to 3e permit, on the one hand, the equipment to be operated almost without any backmixing between the individual cells and, on the other, the selective transport of the reaction product and the gaseous hydrogen chloride that is evolved during the reaction. During the intensive mixing, which is promoted by baffles 5, the halogen halide, on its path through the reactor cells, is freed from any adhering traces of halogensilane before it leaves the reactor through the waste gas line 19 which is provided with a cooling mantle 20. Connecting several stirred cells in series, each of which represents an almost ideal stirred vessel, ensures that silanes are no longer detectable in the reaction product before it overflows into pipeline 21. Admittedly, it is possible in principle to design the inventive apparatus with only three stirred cells. It is, however, advisable to provide at least four and preferably, five stirred cells in order to obtain an end product that is practically free of silanes.

By withdrawing the heat of evaporation from the hydrogen chloride, the reaction mixture in the lower region of the reactor is cooled off. Should it prove necessary to control the temperature, the reaction tank can be heated or cooled with temperature-controlling mantle 23.

It is also possible to feed pure alcohol or an alcohol/water mixture into the lower region of the reactor through pipeline 13, and, if necessary, to meter in only water through pipeline 10. The mass stream coming through pipeline is then also supplied through a controllable metering pump 15. A shut-off device 14 before the reactor inlet is also provided. However, feeding in at least the bulk of the water over pipeline 10 into the second stirred cell 3b, is preferred.

As a consequence of the continuous mode of operation, the reaction mixture slowly rises in the stirred cells of the reactor in proportion to the amount of silane and alcohol/water supplied. To adjust the reaction temperature to the desired value of $+30°$ C. to $80°$ C., the heating mantle 22 of reactor 1 is charged with heating fluid. The reaction streams are supplied in amounts such that after about 60 to 180 minutes, the reaction mixture arrives at the overflow site of reactor 1, where pipeline 21 opens up into the reactor. The reaction mixture flows through pipeline 21 into a device for further processing, especially for separating the alcohol and the hydrogen chloride dissolved in the alcohol.

The hydrogen chloride, discharged through pipeline 19, can be absorbed in water in a waste gas scrubber and the hydrochloric acid formed in low concentration, can be neutralized.

A preferred embodiment of the inventive equipment is one wherein pipeline 21 discharges into a tank 24, in whose upper region an overflow pipeline 25 is arranged and in whose base a discharge pipeline 27 is arranged as a siphon. The siloxane phase separates from the alcohol phase in tank 24. The alcoholic phase, which contains hydrogen chloride and is generally saturated with hydrogen chloride, runs continuously through overflow pipeline 25 into an intermediate storage tank 26 and is supplied from there to the metering device 18.

The reaction product is drawn off from the separating vessel 24 by means of pipeline 27 and worked up in a known manner. For example, the hydrogen halide, still present in the reaction product, can be neutralized with basic, preferably pulverulent compounds, such as, calcium oxide or magnesium oxide. If the reaction product still contains slight amounts of SiCl groups, these groups can be removed by the renewed addition of alcohol, followed by heating the siloxane/alcohol mixture.

The process and the apparatus of the invention are illustrated by the following examples:

EXAMPLE 1

Preparation of a Methylethoxypolysiloxane

Methyltrichlorosilane (25 kg/hr) is fed into the apparatus shown in the drawing through pipeline 7 and hydrogen chloride-containing alcohol (30 kg/hr) is fed in over pipeline 16. The alcohol mixture contains 19.5 kg of ethanol and 10.5 kg of hydrogen chloride. The temperature of the methyltrichlorosilane is about 18° C. and that of the acidic alcohol about 30° C. As a result, the temperature of the reaction in stirred cell 3a adjusts itself to a value of −10° C. The reaction mixture leaves the first stirred cell 3a and encounters an alcohol water stream of 7.73 kg/hr, which comprises 3.98 kg of water and 3.75 kg of ethanol and is fed in through pipeline 10. This mixture has a temperature of 20° C. The reaction mixture leaves the second stirred cell 3b with a temperature of 30° C. The heating and cooling mantle 22 for stirred cells 3c to 3e is controlled so that the reaction mixture, emerging through pipeline 21, has a temperature of 40° C. The average residence time of the reaction mixture is 2.1 hours. The waste gas stream, comprising essentially hydrogen chloride, leaves the reactor through pipeline 19. The reaction mixture, leaving the reactor, reaches separator 24, from which hydrogen chloride-containing alcohol runs off continuously through pipeline 25. This alcohol is recycled with a temperature of 30° C. from intermediate storage tank 26, through pipeline 16, into the first stirred cell 3a. The reaction product, which contains hydrogen chloride and alcohol, is removed through pipeline 27.

The reaction product is conveyed to a thin-film evaporator (not shown) in which it is distilled under normal pressure. The acidic distillate is also fed in through intermediate storage tank 26 and pipeline 16.

The product now reaches a mixing tank in which it is mixed with alcohol and treated with magnesium oxide in order to neutralize it. From there, the product is passed through a filter into a second thin-film evaporator, where it is distilled once again under a pressure of 50 hPa. The alcohol distilled off is returned to the mixing tank. The end product, leaving the second thin-film evaporator at a rate of 13.5 kg/hr, is filtered once again.

The methylethoxypolysiloxane thus prepared is a colorless, clear liquid for which the following analytical data are obtained:
Ethoxy content: 29 weight percent
Viscosity: 500 mPas at 25° C.

EXAMPLE 2

Preparation of a Phenylmethylethoxy Polysiloxane

A phenylmethylethoxy polysiloxane is prepared by the method described in Example 1, with the following changes. A mixture of 18 kg of phenyltrichlorosilane, 6.5 kg of methyltrichlorosilane and 4.2 kg of dimethyldichlorosilane is fed into pipeline 7 at a temperature of 18° C. and 60 kg/hr of hydrogen chloride-containing alcohol are added through pipeline 16 at a temperature of 45° C. In the first stirred cell 3a, the temperature adjusts to a value of 5° C. during the reaction. A mixture of 3.2 kg/hr of water and 5.5. kg/hr of ethanol is metered in through pipeline 10. The temperature in the second stirred cell 3b is 35° C. The reaction mixture, leaving through pipeline 21 at a rate of 80 kg/hr, has a temperature of 60° C. The average residence time is 0.8 hours. The reaction product is withdrawn through pipeline 27 at a rate of 22 kg/hr and is worked up as in Example 1.

The phenylmethylethoxy polysiloxane thus prepared has the following analytical data:
Ethoxy content: 22.6 weight percent
Viscosity: 350 mPas at 25° C.

EXAMPLE 3

Preparation of a Phenylmethylethoxy Polysiloxane Resin

A phenylmethylethoxy polysiloxane is prepared by the method described in Example 1, with the following changes. A mixture of 11.15 kg/hr of phenyltrichlorosilane, 7.88 kg/hr of methyltrichlorosilane and 3.90 kg/hr of polydimethylsiloxane (chain length of 50 Si units) is fed in over pipeline 7 at a temperature of 20° C. Hydrogen chloride-containing alcohol, consisting of 4.5 kg hydrogen chloride and 25.5 kg of alcohol is metered in at a rate of 30 kg/hr and at a temperature of 20° C. through pipeline 16. The temperature in the first stirred cell 3a adjusts to 15° C. A mixture of equal parts by weight of water and alcohol is added at a rate of 5.3 kg/hr through pipeline 10. The temperature in stirred cell 3b is 30° C. The reaction product, withdrawn through pipeline 21 at a rate of 15 kg/hr, has a temperature of 65° C. and is worked up as follows:

The acidic, crude product is distilled at atmospheric pressure in the first of two thin-film evaporators, which are connected in series. Before it enters the second thin-film evaporator, about 50 volume percent of hydrogen chloride-free alcohol are added and all of the alcohol is drawn off once more at a pressure of 20 to 50 hPa. The resin leaving the second thin-film evaporator is mixed with xylene. The acidic alcohol from the first evaporator is taken to the intermediate storage tank 26, while the alcohol from the second evaporator, after being neutralized, is added once again to the crude product leaving the first evaporator.

The solution of phenylmethylethoxy polysiloxane thus prepared has the following analytical data:
Solids: 70 weight percent
Ethoxy content: 6.2 weight percent
Viscosity: 600 mPas at 25° C.

We claim:

1. A process for continuously synthesizing alkoxypolysiloxanes having the formula $$R_a^1 Si(OR^2)_b O_{\frac{4-(a+b)}{2}}$$

in which $R^1$ is an alkyl or aryl radical,
$R^2$ is a lower alkyl radical with 1 to 4 carbon atoms,
a is not greater than 1.5,
b is not greater than 2, and
a+b is not greater than 3,
by solvolysis of chlorosilanes having the formula $$R_a^1 SiCl_{4-a}$$

with an excess of alcohol and less than an equivalent amount of water, based on the silicon-linked chlorine, and partial condensation of the solvolysis products, comprising continuously feeding a silane or a silane mixture and a mixture of hydrogen chloride-containing alcohol and water into the first stage of a reactor having a plurality of sequential stages, wherein each subsequent stage is positioned higher than the preceding stage, continuously withdrawing the reaction product formed together with excess hydrogen chloride-containing alcohol after a residence time of 30 to 180 minutes from the last sequential stage of the reactor and carrying off the undissolved, gaseous portion of hydrogen chloride from the last stage, wherein the temperature of the reaction mixture or the reaction product as it flows through the reactor is raised from a temperature of $-17$ to $+30°$ C., to a range of $+30°$ to $+80°$ C., the temperature gradient being at least $10°$ C., and separating the excess alcohol and dissolved hydrogen chloride from the reaction product formed exterior of the reactor and recycling the separated hydrogen chloride-containing alcohol to the initial stage of the reactor.

2. The process of claim 1 wherein the silane or the silane mixture is first mixed with all or a partial amount of the hydrogen chloride-containing alcohol and the the water with any remaining portion of alcohol is metered into this first mixture.

3. The process of claim 1 or 2 wherein the silane or a silane mixture supplied to the reactor contains organopolysiloxanes.

4. The process of claim 1 or 2 wherein the mixture drawn off from the reactor is heterogeneous and is separated into a siloxane phase and a hydrogen-chloride-containing alcohol phase, the siloxane phase is freed from any dissolved alcohol and hydrogen chloride and the hydrogen chloride-containing alcohol phase is returned to the reactor.

5. The process of claim 1 or 2 wherein the alkoxypolysiloxanes obtained are mixed with an excess, relative to the SiCl groups and dissolved hydrogen chloride still present, of hydrogen chloride-free alcohol and heated under reflux conditions, and the alcohol and the hydrogen chloride are thereafter distilled off.

6. The process of claim 1 or 2 wherein the reactor is cylindrical.

7. The process of claim 5 wherein the reaction product is neutralized.

8. The process of claim 1 or 2 wherein $R^1$ is alkyl having 1 to 6 carbon atoms.

9. The process of claim 1 or 2 wherein $R^1$ is selected from the group consisting of alkyl radicals having up to 18 carbon atoms, unsaturated alkyl and phenyl.

10. The process of claim 3 wherein the organopolysiloxanes contain mono, di, and trifunctional organosiloxy units.

11. The process of claim 3 wherein the organopolysiloxanes have $R^2O$-alkoxy group linked to silicon.

12. The process of claim 1 or 2 wherein the reactor is a vertical reactor.

13. The process of claim 1 wherein the reactor is a cylindrical reactor.

14. The process of claim 1 wherein a single reactor is used.

UNITED STATES PATENT AND TRADEMARK OFFICE
CERTIFICATE OF CORRECTION

PATENT NO.  : 4,609,752

DATED       : September 2, 1986

INVENTOR(S) : Herbert Giesing, et al

It is certified that error appears in the above-identified patent and that said Letters Patent is hereby corrected as shown below:

The names of the Inventors should read as follows:

-- [75] Herbert Giesing; Götz Koerner,

Václav Kropac, all of Essen;

Hans-Jürgen Patzke,

Gelsenkirchen-Resse; Herbert

Quilitsch, Heiligenhaus; Harald Rau,

Essen; Eckehard Schamberg, Essen;

Fritz Spieker, Essen; Christian

Weitemeyer, Essen, all of Fed. Rep.

of Germany --.

Signed and Sealed this

Fourth Day of November, 1986

[SEAL]

*Attest:*

DONALD J. QUIGG

*Attesting Officer*  *Commissioner of Patents and Trademarks*